United States Patent
Solheim et al.

(10) Patent No.: US 8,620,897 B2
(45) Date of Patent: Dec. 31, 2013

(54) INDEXING AND SEARCHING FEATURES INCLUDING USING REUSABLE INDEX FIELDS

(75) Inventors: Helge Grenager Solheim, Oslo (NO); Øystein Fledsberg, Ranheim (NO); Evan Matthew Roark, Asker (NO); Michael Susaeg, Hosle (NO)

(73) Assignee: Microsoft Corporation, Redmond, WA (US)

( * ) Notice: Subject to any disclaimer, the term of this patent is extended or adjusted under 35 U.S.C. 154(b) by 223 days.

(21) Appl. No.: 13/045,790

(22) Filed: Mar. 11, 2011

(65) Prior Publication Data
US 2012/0233147 A1    Sep. 13, 2012

(51) Int. Cl.
*G06F 17/30* (2006.01)

(52) U.S. Cl.
USPC .......................................... 707/709; 707/741

(58) Field of Classification Search
USPC ................................................. 707/709, 741
See application file for complete search history.

(56) References Cited

U.S. PATENT DOCUMENTS

| 7,020,654 | B1 * | 3/2006 | Najmi ................................. 1/1 |
| 7,779,039 | B2 * | 8/2010 | Weissman et al. ............. 707/793 |
| 8,037,075 | B2 * | 10/2011 | Millett .......................... 707/741 |
| 8,122,040 | B2 * | 2/2012 | Banister et al. ............... 707/759 |
| 2005/0223022 | A1 | 10/2005 | Weissman et al. ............. 707/102 |
| 2005/0283478 | A1 * | 12/2005 | Choi et al. ......................... 707/9 |
| 2006/0224592 | A1 * | 10/2006 | Kapadia et al. ................. 707/10 |
| 2007/0124276 | A1 * | 5/2007 | Weissman et al. ................ 707/2 |
| 2007/0130137 | A1 * | 6/2007 | Oliver et al. ...................... 707/5 |
| 2008/0162544 | A1 | 7/2008 | Weissman et al. ............ 707/103 |
| 2011/0082864 | A1 * | 4/2011 | Banister et al. ............... 707/741 |
| 2011/0082890 | A1 * | 4/2011 | Banister et al. ............... 707/792 |

OTHER PUBLICATIONS

Jun. 13, 2010. "Full Text Search in the Cloud . . . As a Service!" https://www.blurpr.com/blog/index.php/2010/06/13/full-text-search-in-the-cloud-as-a-service/.
Tharindu Mathew. Oct. 12, 2010. "Multi Cores vs Filter Queries for a Multi Tenant Deployment." Lucid Imagination. http://search.lucidimagination.com/search/document/bdd1054e2a17e3a8/multi_cores_vs_filter_queries_for_a_multi_tenant_deployment.
Lucid Imagination. Jul. 1, 2010. "Boomi Unlocks the Cloud with Solr." http://www.populararticles.com/article205249.html.
database. com. Printed Dec. 8, 2010. "The Multitenant Architecture of Database.com." http://wiki.database.com/page/The_Multitenant_Architecture_of_Database.com.
Stefan Aulbach et al. Jun. 2008. "Multi-Tenant Databases for Software as a Service: Schema-Mapping Techniques." SIGMOND '08. http://citeseerx.ist.psu.edu/viewdoc/download?doi=10.1.1.142.2527&rep=rep 1&type=pdf.

* cited by examiner

*Primary Examiner* — Jean M Corrielus
*Assistant Examiner* — Evan Aspinwall
(74) *Attorney, Agent, or Firm* — Merchant & Gould

(57) ABSTRACT

Indexing and searching features are provided including associated system, methods, and other implementations. A computing system of an embodiment is configured to reuse or repurpose physical index fields for different tenants as part of providing efficient and scalable indexing and searching services. A method of one embodiment operates to provide an indexed data structure that includes a number of reusable index fields that are shared and used to index information associated with a plurality of tenants. Other embodiments are included.

18 Claims, 9 Drawing Sheets

| | URL | title | Body | A1_1 | A1_2 | A2_1 | A2_2 | A3_1 | A3_2 |
|---|---|---|---|---|---|---|---|---|---|
| Docs1 | | | | : | : | ■ | ■ | ■ | ■ |
| Docs2 | | | | ■ | ■ | ** | ** | // | // |
| Docs3 | | | | ■ | ■ | ■ | ■ | // | // |

FIGURE 3C

INDEXING AND SEARCHING FEATURES INCLUDING USING REUSABLE INDEX FIELDS

BACKGROUND

Indexing methods are used to manage information of complex computing environments as part of optimizing searching systems and techniques to provide relevant search results. Many of the current search engines index items using different physical field structures for each aspect or property of an item to be indexed, leading to very large and high maintenance data structures. For example, a typical technical report may have properties such as title, uniform resource locator (URL), main content, author, date and time of last edit as a few examples. A product description may include properties such as price, size, weight, color, and flavor as examples. The different types of information to be indexed and used may differ significantly from one tenant to the next, resulting in large numbers of physical index fields and empty areas of an associated index. A tenant may refer to a person or group that rents and/or uses infrastructure shared with others, while being logically isolated from other tenants.

Correspondingly, when offering a search as a service, a search system needs to be cognizant of the fact that different customers or tenants have different types of items to index. Typically, a search service uses dedicated physical structures for the union of all properties of all items of all the different tenants, resulting in an index having a lot of holes and a high number of physical structures to handle for all the various properties. One solution uses a separate index per tenant which results in a large total number of physical structures than when storing the union of all properties in the same index. However, current indexing techniques are not configured to reuse physical index fields as part of providing indexing and searching services.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide indexing and searching features, but are not so limited. In an embodiment, a computing system is configured to reuse or repurpose physical index fields for different tenants as part of providing indexing and searching services. A method of one embodiment operates to provide an indexed data structure that includes a number of reusable index fields that are shared and used to index information associated with a plurality of tenants. Other embodiments are included.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIGS. 3A-3C depict a number of exemplary tenant index sets and exemplary indexing representations.

DETAILED DESCRIPTION

Figure 1:
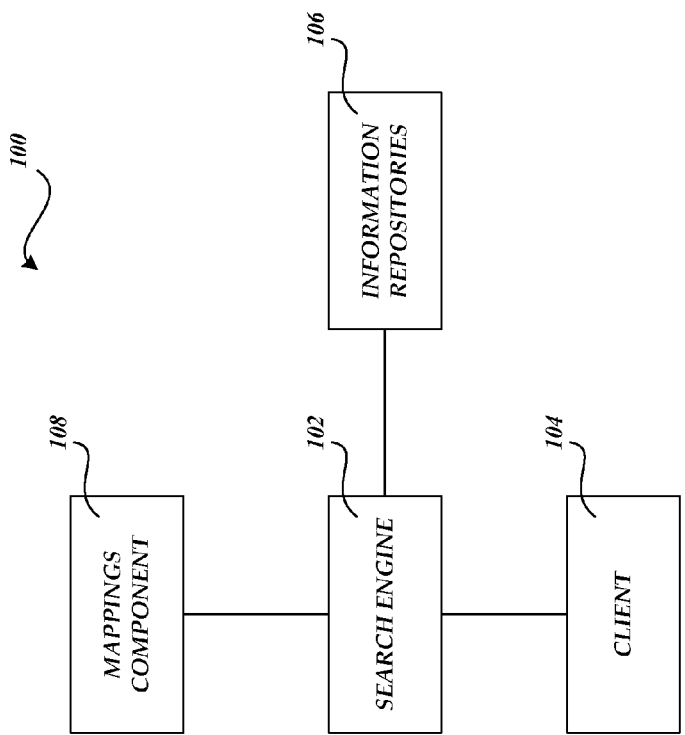
FIG. 1 is a block diagram of an exemplary computing environment.

FIG. 1 is a block diagram of an exemplary computing environment 100 that includes processing, memory, and other components/resources that provide indexing, searching, and/or other information processing operations. Components of the environment 100 include features and functionalities to crawl content, add metadata, produce index representations, and serve search queries, but are not so limited. As described below, an indexing model of one embodiment can be used to provide an indexing structure that includes a number of reusable index fields, wherein each reusable index field is configured to contain different data of the same data type for each tenant, but is not so limited.

For example, the components of the environment 100 can operate to route or map the same data types of different tenants into the same indexing field structures so that sortable properties are stored in the same physical index fields. In one embodiment, the components of the environment 100 use a schema model per tenant and a mapping from each tenant schema to defined reusable index fields since each tenant typically requires use of their own particular items and/or a small number of unique or tenant-specific properties. As such, a reduced index associated with unique or tenant-specific properties and a limited set of physical index fields can be shared and reused by all associated tenants based in part on a reusable field indexing model.

As described below, according to an embodiment, components of the environment 100 automatically use the same physical field for different properties of a plurality of tenants which significantly reduces the total number of physical fields of an associated index. The components can use an item's properties and requirement for features (e.g., sorting, refiners, range searches, queries, etc.) as part of mapping operations to available reusable physical index fields. As such, components can use indexing techniques directly since the mappings map to fields of the same type for all tenants associated with the indexing service.

As shown in FIG. 1, the exemplary environment 100 includes a search engine 102 communicatively coupled to one or more clients 104 and/or one or more information repositories 106. In one embodiment, the information repositories 106 are used to provide crawled data associated with a number of tenant site collections, sites, farm content, etc. In one embodiment, the environment 100 includes a shared services farm that can be used to provide a search service including the search engine 102 that includes indexing features that use, and reuse or repurpose, the same physical index fields for a plurality of associated tenants.

As described below, the mappings component 108 includes a number of mappings used to map information of the one or more repositories 106 to a number of reusable index fields. The search engine 102 can include indexing features that utilize properties of the reusable index fields to store information associated with multiple tenants. Each reusable index field of one embodiment can be associated with multiple tenants such that the mappings map tenant specific information (e.g., overlapping and partially overlapping managed properties) for a plurality of tenants to corresponding reusable index fields.

Each reusable index field of one embodiment can be used as part of providing indexing operations associated with a particular data type and/or feature for each tenant (see FIG. 2 for example) when indexing tenant-specific properties and associated information. In one embodiment, the index is maintained by storing each reusable index field as a distinct file having a representative data structure. Accordingly, the mappings component 108 can be configured to include mappings associated with a single instance of a tenant's managed property schema or mappings associated with multiple schemas of a multi-tenancy implementation.

With continuing reference to FIG. 1, the search engine 102 of an embodiment includes indexing features used to process any number of searchable items including, but not limited to, web pages, documents of any kind, spreadsheets, music files, picture files, video files, contacts, lists and list items, tasks, calendar entries, content of any kind, metadata, meta-metadata, etc. The search engine 102 of one embodiment includes features that operate, but are not so limited, to: create indexes based on raw textual input and/or return results for queries by using the indexes; receive content from various clients, crawlers, connectors, etc. which can be processed and indexed; and/or parse information including documents and other content to produce a textual output, such as a list of properties including document title, document content, body, locations, size, etc. as examples.

As described below, the indexing features of the search engine 102 can be used in conjunction with refinable, sortable, retrievable, and/or other manageable properties as part of providing proper mappings to associated reusable index fields. For example, the search engine 102 can use the indexing features to map tenant information of a plurality of tenants to one or more of reusable index fields based in part on one or more of refinable, sortable, queryable, and/or retrievable field types.

A refinable field type of an embodiment can be used to manage refinable properties as part of refining a query or some result. For example, a refinable field type can be used as part of a process to drill into query results by using aggregated statistical data, such as using some distribution of managed property values in query results. As an example, a refinable property can be used as part of a search for "Car" over a networked repository that includes cars for sale. As such, the refinable property can be used to return a refiner for a price property as shown in Table 1 below.

TABLE 1

| Refiner (Price range ($)) | No. of cars |
|---|---|
| 0-1000 | 3 |
| 1001-5000 | 45 |
| 5001-10000 | 534 |
| 10001-100000 | 24 |
| >100000 | 15 |

As shown in Table 1, the refinable property or refiner has returned the number of cars that have a price in the associated range. Continuing the example, another refinable property or refiner can be used to return the number of cars for an associated color as shown in the example of Table 2.

TABLE 2

| Refiner (Color) | No. of cars |
|---|---|
| Green | 45 |
| Red | 234 |
| Blue | 215 |
| White | 104 |
| Other | 23 |

A sortable field type of an embodiment can be used in conjunction with sortable properties as part of sorting a result set for example. For the example above, price may have been defined as a sortable property and the search engine can return the identified cars sorted by price (e.g., highest to lowest). A queryable field type of an embodiment can be associated with a field that can be explicitly queried based in part on a particular input requirement (e.g., including the field name as part of query).

A retrievable field type of an embodiment can be associated with a retrievable property that can be defined and returned with a result set, but may not be itself searchable. For example, a tenant administrator of a used car repository could specify that the name and contact information of a car owner is retrievable but not used in relevancy determinations since a buyer would not typically consider such information as part of a search criteria. According to an embodiment of the environment 100, as part of providing indexing features, each tenant can explicitly identify whether a property is to be refinable, sortable, queryable, and/or retrievable.

The indexing features of the search engine 102 can be used to build language specific and other indexing structures using tenant-specific language processing during document and other item processing operations. As described below, the search engine 102 can operate to minimize and/or eliminate space taking nulls as part of providing indexing services by mapping custom tenant managed information into reusable index fields having proper and correct characteristics. Moreover, potentially expensive additional transformation operations are not required since the tenant information is mapped directly into the reusable index fields targeted for indexing particular data types.

Figure 2:
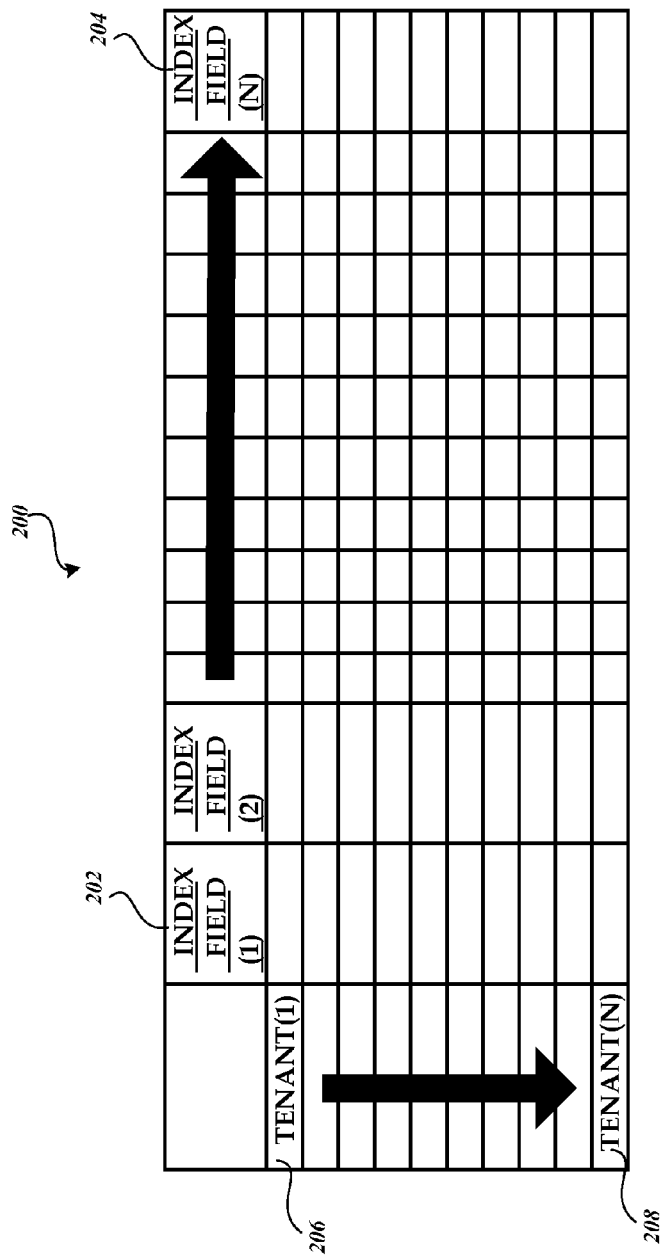
FIG. 2 depicts an exemplary index representation that includes a number of reusable index fields.

FIG. 2 depicts an exemplary index representation 200 that includes a number of reusable index fields (e.g., reusable index field (1) 202 through reusable index field (N) 204). It will be appreciated that the exemplary index representation 200 corresponds with a logical order defined by the indexing features and/or information to be indexed. As described above, each reusable index field of the index representation 200 can be used to index information associated with a plurality of tenants (e.g., tenant(1) 206 through tenant(N) 208).

In one embodiment, each reusable index field can be used to index tenant-specific managed property information of a same data type (e.g., one tenant may have a managed property having a numeric data type corresponding to weight, whereas another tenant may have a managed property also having the numeric data type used instead for age). Multiple tenant implementations, also referred to as multi-tenancy, refers to an ability to partition data of otherwise shared services or software in order to accommodate multiple tenants. In one embodiment, the exemplary index representation 200 can include additional index fields used to index commonly shared properties across a multi-tenant space or domain. In one embodiment, a search service can maintain a first index set associated with commonly shared tenant properties and a second smaller index set associated with tenant-specific properties including a plurality of reusable index fields.

In one embodiment, the index representation 200 corresponds with an indexed data structure wherein each index field: is uniquely identified by a name; has a type: integer, string, date/time, decimal, or double; may or may not be retrievable; may or may not be sortable; may or may not be refinable; may or may not be in a full-text index, i.e. freely searchable; and/or may or may not be queryable (e.g., possible to query for in a query if the field name is explicitly listed before the query term). Accordingly, a reusable index data structure can be configured to include different types of index fields depending on one or more of these features.

As an example, a reusable index data structure can be configured to include one or more of the following reusable index field types including:

A first field type corresponding to searchable strings (in a full-text index);

A second field type corresponding to queryable strings;

A third field type corresponding to sortable and refinable strings;

A fourth field type corresponding to queryable integer information with range search;

A fifth field type corresponding to queryable date/time information with range search;

A sixth field type corresponding to queryable fixed point decimal information with range search;

A seventh field type corresponding to queryable floating point double information with range search;

An eighth field type corresponding to sortable and refinable integer information;

A ninth field type corresponding to sortable and refinable date/time information;

A tenth field type corresponding to sortable and refinable decimal information;

An eleventh field type corresponding to sortable and refinable double information; and/or, A twelfth field type corresponding to retrievable values.

In one embodiment, the twelfth field type utilizes one shared structure for indexing integer, string, date/time, decimal, and/or double information. In multi-tenant indexing implementations, it is not uncommon for one single item property to require more than one of the exemplary field types to be stored properly as part of providing a rich search platform. For example, a sortable and refinable string that is also searchable and retrievable can be mapped to index fields of the first, third, and twelfth types. As described above, tenant-specific schemas can be used to automatically map the tenant properties to appropriate underlying index fields.

Figure 3A:
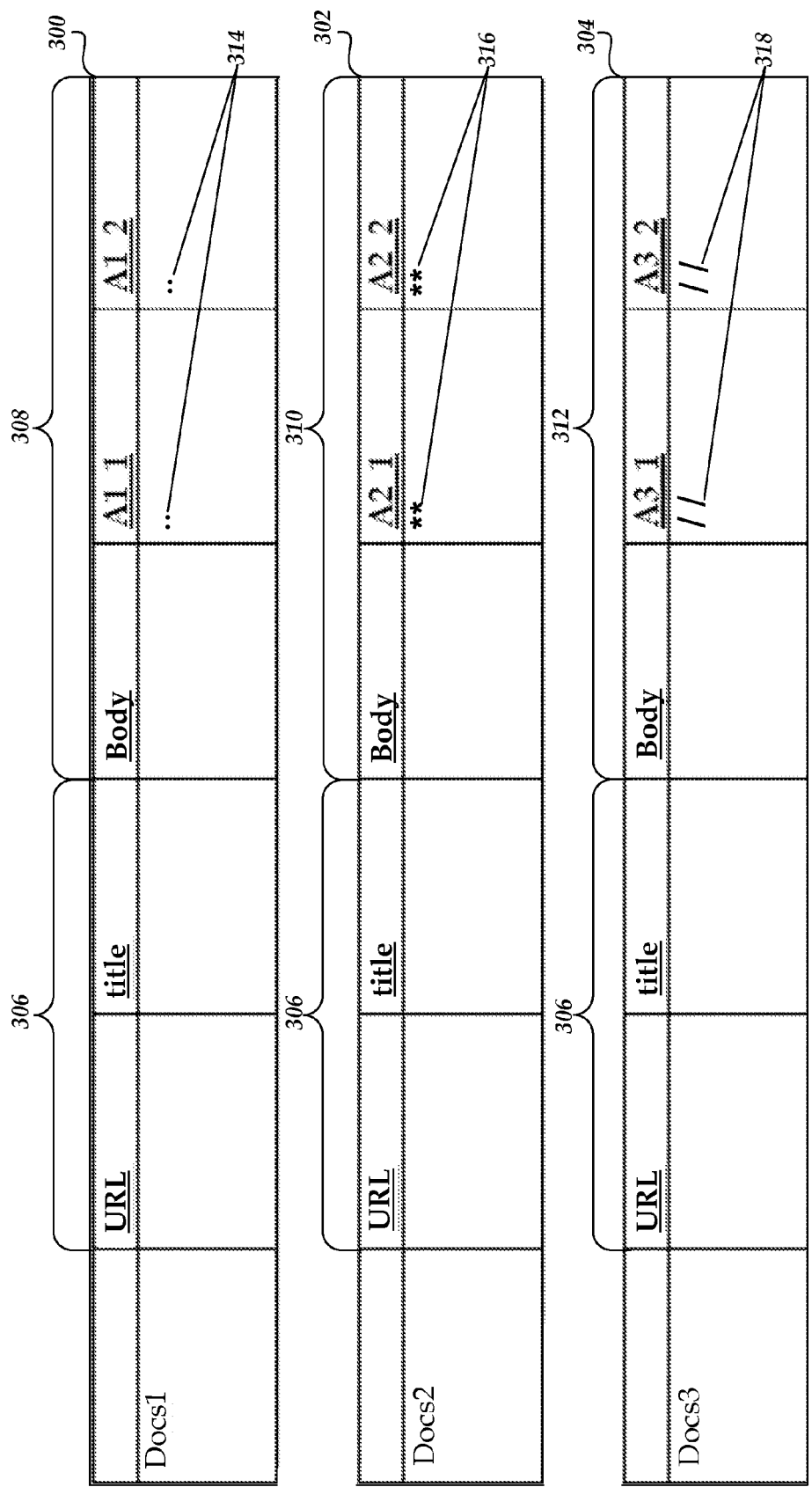
Figure 3B:
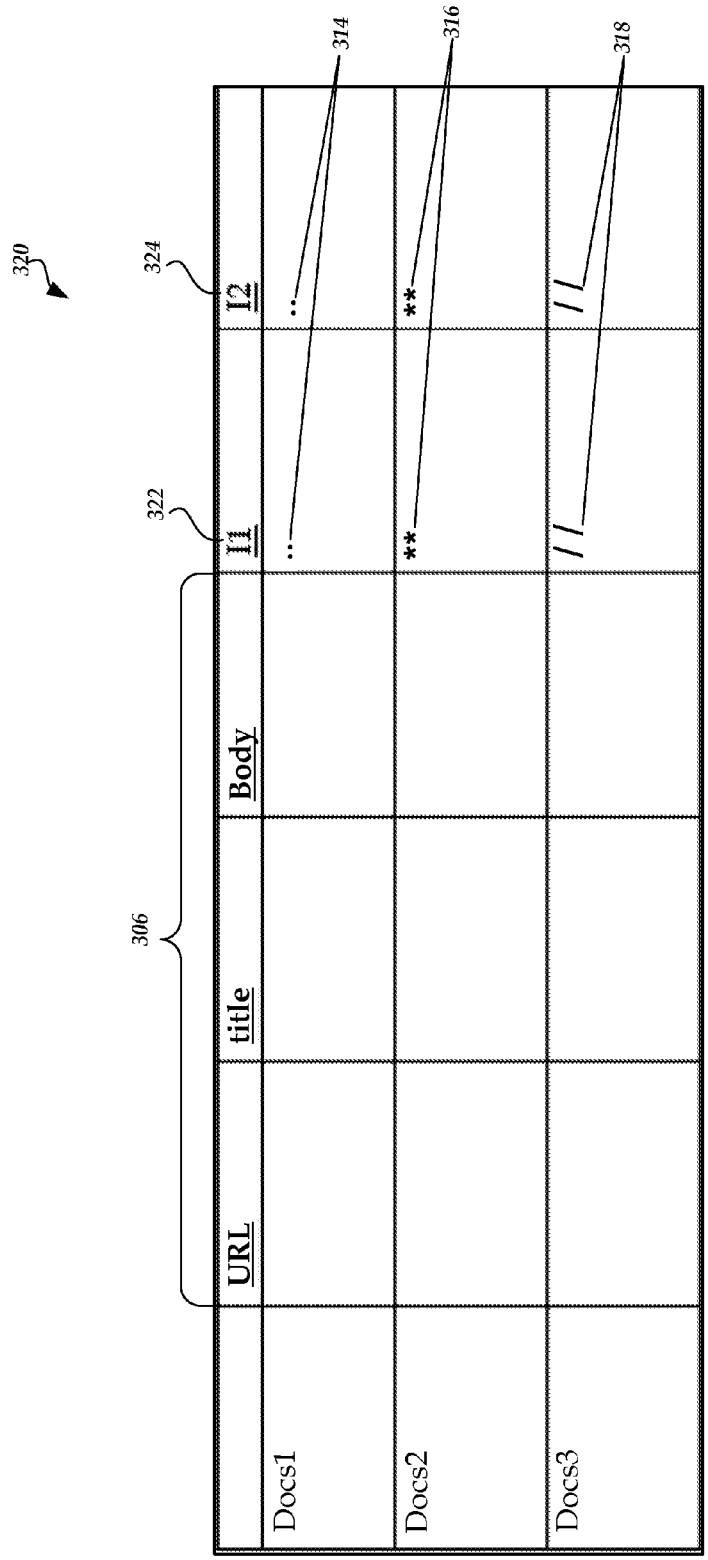

FIGS. 3A-3C depict a number of exemplary tenant index sets 300-304 and associated index representations. FIG. 3A depicts a first index set 300 associated with a first tenant, a second index set 302 associated with a second tenant, and a third index set 304 associated with a third tenant. For this example, each of the index sets includes a number of shared properties 306 (e.g., for uniform resource locator (URL), title, Body). For example, a number of shared or common managed properties can be used to index information associated with people (e.g., contacts) and information relevant to typical documents and/or web pages of any kind.

Table 3 below includes a number of exemplary shared properties.

TABLE 3

| Field name | Description |
| --- | --- |
| AboutMe | For a contact, or the author of a document, a description of the person |
| Anchortextpartial | List of anchor texts in documents pointing to this document |
| AssignedTo | Name of assignee (if task or similar) |
| Author | All forms of name of the author who wrote this document |
| Body | The body text of the item |
| Charset | The character set used in the document |
| Colleagues | List of colleagues, for e.g a contact |
| Companies | Company names found in the item using property extraction |
| Contentclass | Type of document |
| ContentSource | Origin of document |
| Created | Creation date for the item |
| CreatedBy | Name of creator |
| Department | Department of contact if this is a contact, or department of author if a document |
| Description | Any kind of free-text description of this item |
| Docacl | List of security principals allowed to see this item |
| Docaclsystemid | Security system principals for this item belong to |
| DocComments | Free-text comments |
| DocKeywords | Free-text keywords |
| Docrank | Static rank-value of document (a rank score which is independent of query) |
| DocSubject | Subject for this item |
| Docvector | A similarity vector representation for this item |
| Domain | URL domain, e.g., www.contoso.com |
| DuplicateHash | A document signature for the item |
| EndDate | For a task, when it ends |
| ExpirationTime | When the item is no longer valid |
| File Extension | A file extension |
| Filename | Name of original file |
| FirstName | Name of contact |
| Format | Symbolic representation of the item format, e.g., Internet HTML |
| HostingPartition | GUID representing tenant to which this item belongs |
| Interests | If a contact, details about that contact |
| JobTitle | Job title of a contact |
| Keywords | Additional keywords |
| Language | Detected written language for the item. For multi-lingual items, this is the primary language detected |

TABLE 3-continued

| Field name | Description |
| --- | --- |
| Languages | Detected written languages for the item. Contains all detected languages for multi-lingual items |
| LastModifiedTime | Last time this indexed version of the item was updated (may be newer in the source) |
| LastName | Name of contact |
| Location | Item location |
| Locations | Geographical locations found in the item using property extraction |
| ManagedProperties | Tracking all managed properties in use for each document |
| Memberships | List of groups a contact is a member of |
| MetadataAuthor | Name of person who created various metadata |
| MobilePhone | Phone no. of a contact |
| ModifiedBy | Name of last person modifying this item |
| PastProjects | List of projects a contact has worked on in the past |
| Path | Path to this item |
| personnames | Person names found in the item using property extraction |
| PictureHeight | Description of an optional picture going with the item |
| PictureThumbnailURL | Description of an optional picture going with the item |
| PictureURL | Description of an optional picture going with the item |
| PictureWidth | Description of an optional picture going with the item |
| PreferredName | Preferred name of a contact |
| Priority | Priority number of this item |
| ProcessingTime | Date/time when the item was processed by item processing |
| Pronunciations | Pronunciations of a contacts name |
| Purpose | What the item is used for |
| Responsibilities | A contacts responsibilities |
| Schools | List of schools attended by a person |
| Site | Site that a document originates from |
| SiteName | The URL of the site that contains the crawled item. If the crawled item is not contained in a site, this property is absent. |
| SiteRank | Score reflecting the expected quality of the site the document came from |
| SiteTitle | Title of the item's site |
| Size | Size of the item |
| Skills | Skills of a contact/person |
| StartDate | A start date, e.g., a task start date |
| Status | Status of the item, e.g. ready for review |
| Tags | Any user defined tags |
| Teaser | A query independent document summary for this item |
| Title | Title for the crawled item |
| TLD | Top level domain for a document |
| Url | The URL of the matching item |
| UrlKeywords | The individual (key)words of an URL string |
| Urls | A list of all URLs that point to the item (including duplicates and hypertext markup language (HTML) redirects) |
| UserName | some system-related user name of a contact |
| UserProfile_GUID | user id of a contact |
| WorkEmail | e-mail address of a contact |
| WorkPhone | phone no of a contact |
| Other | |

With continuing reference to FIG. 3A, the index set 300 includes a set of tenant-specific properties 308 (A1_1 and A1_2), the index set 302 includes a set of different tenant-specific properties 310 (A2_1 and A2_2), and the index set 304 also includes yet a different set of tenant-specific properties 312 (A3_1 and A3_2). For this simplified example, the underlying data types for each of the tenant-specific properties are of the same type. As shown in FIG. 3A, documents of tenant 1 (Docs1) have values 314 for the set of tenant-specific properties 308 (A1_1 and A1_2), the documents of tenant 2 (Docs2) have values 316 for the set of tenant-specific properties 310 (A2_1 and A2_2), and the documents of tenant 3 (Docs3) have values 318 for the set of tenant-specific properties 312 (A3_1 and A3_2).

FIG. 3B depicts a resulting index representation 320 of an embodiment based in part on the use of reusable index fields 322 and 324. As described above, each of the reusable index fields 322 and 324 can be mapped to corresponding files, or different parts of the same file, of an associated index. As shown in FIG. 3B, since the values 314 (e.g., age), values 316 (e.g., weight), and values 318 (e.g., capacity) are of the same data type (e.g., decimal, integer, etc.), reusable fields 322 and 324 are used to efficiently and effectively index the associated tenant information resulting in fewer holes and a compact data structure without having to add additional physical index fields for each tenant. For example, reusable index field 322 can be configured as a sortable and refinable field type, and reusable index field 324 can be configured as a queryable field type.

According to the underlying field types, indexing operations have mapped content of tenant 1 to reusable index fields 322 and 324 (I1(1) and I2(1)), content of tenant 2 to the reusable index fields 322 and 324 (I1(2) and I2(2)), and content of tenant 3 to the reusable index fields 322 and 324 (I1(3) and I2(3)). The mapping (e.g., 308→322,324) or mappings of an embodiment are persisted and used consistently for the corresponding tenant. In one embodiment, components use the same mappings at all times to prevent searching in the wrong data portions and returning incorrect or erroneous search hits. For example, one or more mappings can be stored and persisted using a relational database or a simple XML file and versioning mechanism, where updates can be controlled and shared among all components.

As a result of using reusable index fields, fewer, if any, nulls are associated with a resulting indexed data structure. Correspondingly, the overall search and index service performance can be improved by reusing a physical index field for different purposes across different tenants. As described above, the search engine or other component can use additional mappings from tenant-specific managed properties to actual physical index fields, and reusing the physical index fields for different purposes for different tenants.

For the example of FIG. 3B, reusable index fields 322 and 324 contain content (e.g., values) from different managed properties for the different tenants, resulting in fewer holes or voids in the resulting indexed data structure. Since index fields can be mapped to files, there will also be a lot fewer files to store than in the alternative implementation described below in conjunction with FIG. 3C. Additionally, the number of physical fields (and files) can be reduced significantly based in part on the automatic use and reuse of the same physical field for different properties. As described above, mappings can be used to map an item to a physical index field based in part on the item's properties and requirement for additional features (e.g., sorting, refiners, range searches, etc.).

It will be appreciated that the data of Tenant 1, Tenant 2, and Tenant 3 may be mixed in the same physical files using the features described above in conjunction with the reusable index fields 322 and 324 of FIG. 3B. In one embodiment, terms from the various indexed items may be prefixed with tenant ID or some other identifier to avoid impacting other tenant's relevancy and searching operations. The prefixing of an embodiment can be performed inside the indexer so as not to affect other parts of a searching system or service.

In one embodiment, security measures can be used to ensure that content of one tenant does not affect how other tenants view and use their own content based in part on storing the tenant ID owning a document for every document in a property (e.g., tenantID). Whenever a tenant issues a query, a query rewrite operation can be used to rewrite the query with one additional query term including the correct tenant ID (e.g., originalQuery AND tenantID=<tenantID>). The searching and indexing features can be configured to use statistics and other measures on a per-tenant basis (not global).

FIG. 3C depicts an alternative indexed representation 326 that does not include the use of reusable index fields in contrast to the implementation described in conjunction with FIG. 3B. For example, the alternative indexed representation 326 can be used in a cloud setting or deployment, includes tenant-specific fields, and is acceptable for a small number of tenants (e.g., 10-100). The alternative indexed representation 326 results in a number of files and disk consumption that scale proportionally with the number of tenants (see FIG. 6 as an example).

As shown in FIG. 3C, holes or voids 328 and 330 exist in the alternative indexed representation 326 since Tenant 1 Docs do not include values for tenant-specific properties 310 (A2_1, A2_2) and tenant-specific properties 312 (A3_1, A3_2), Tenant 2 Docs do not include values for tenant-specific properties 308 (A1_1, A1_2) and tenant-specific properties 312 (A3_1, A3_2), and Tenant 3 Docs do not include values for tenant-specific properties 308 (A1_1, A1_2) and tenant-specific properties 310 (A2_1, A2_2). Thus, as shown, large portions of the alternative indexed representation 326 will be empty. As a result, the more tenants and managed properties, the more holes or empty field portions.

Additionally, the alternative indexed representation 326 of one embodiment results in: each sortable managed property means four additional files on disk; each refinable managed property means five additional files on disk; each managed property of type integer means four additional files on disk; each queryable managed property must map either to a full-text index (which allows for ranking) or a synthetic index (which does not support ranking); each full-text index item which can contain a number of queryable managed properties means additional files on disk (e.g., four (4) dictionary files in total plus seven (7) files per managed property).

In contrast to the limited solution of FIG. 3C, the reusable index structure described above resulting from the reuse of physical index fields can be configured with the same number of physical index fields (e.g. files) independent of the number of managed properties to be indexed. Additional tenants and associated information can be efficiently mapped to the reusable index structure. Implementing sparse refiners and attribute vectors can assist to improve on eliminating or reducing any empty fields of a particular implemented index.

Figure 4:
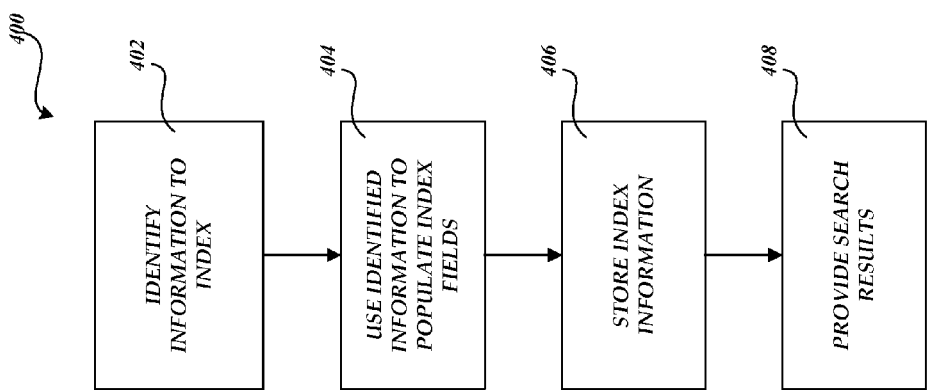
FIG. 4 is a flow diagram depicting an exemplary process of providing indexing operations as part of a searching service.

FIG. 4 is a flow diagram depicting an exemplary process 400 of providing indexing and searching operations as part of a searching service, but is not so limited. For example, the process 400 can be used to virtualize physical index fields across multiple tenants, such as part of the functionality of a search engine deployed in a cloud or other network and used by multiple customers or tenants.

The process 400 at 402 operates to identify information for indexing. For example, an indexing service can be configured to continuously index new and modified tenant data maintained as part of a networked computing architecture. In one embodiment, the process 400 at 402 operates to use information associated with a plurality of tenants based in part on the use of tenant-specific crawlers crawling pages, documents, etc., adding metadata (e.g., filename, location, URL, title, data, author, etc.), and parsing operations to extract various types of information based on the type of item portions (e.g., web page portions, document portions, etc.) that results in a set of properties for each tenant item.

At 404, the process 400 operates to populate index fields with the identified information. In an embodiment, the process 400 at 404 operates to populate one or more reusable index fields based in part on information associated with a plurality of tenant-specific managed properties. For example, the process 400 at 404 can use a schema library of tenant schemas to map tenant data from a plurality of tenant dedicated repositories having data associated with a number of shared and tenant-specific managed properties to an indexed data structure.

The process 400 of one embodiment can use the schema library to track particular crawled property to source (e.g., each tenant schema to shared underlying index fields) mappings. In one embodiment, the process 400 at 404 can be used to generate a main index structure associated with a number of managed properties shared across all subscribing tenants and a reusable index structure associated with a number of reusable index fields for use in mapping to a plurality of tenant-specific managed properties used as part of providing rich search functionality.

At 406, the process 400 operates to store indexed information in mass storage. For example, the process 400 at 406 can operate to store the indexed information using a dedicated server of a searching service farm as part of providing multi-tenant searching services. At 408, the process 400 operates to use the stored indexed information to serve queries and provide search results. While a certain number and order of operations is described for the exemplary flow of FIG. 4, it will be appreciated that other numbers and/or orders can be used according to desired implementations.

Figure 5:
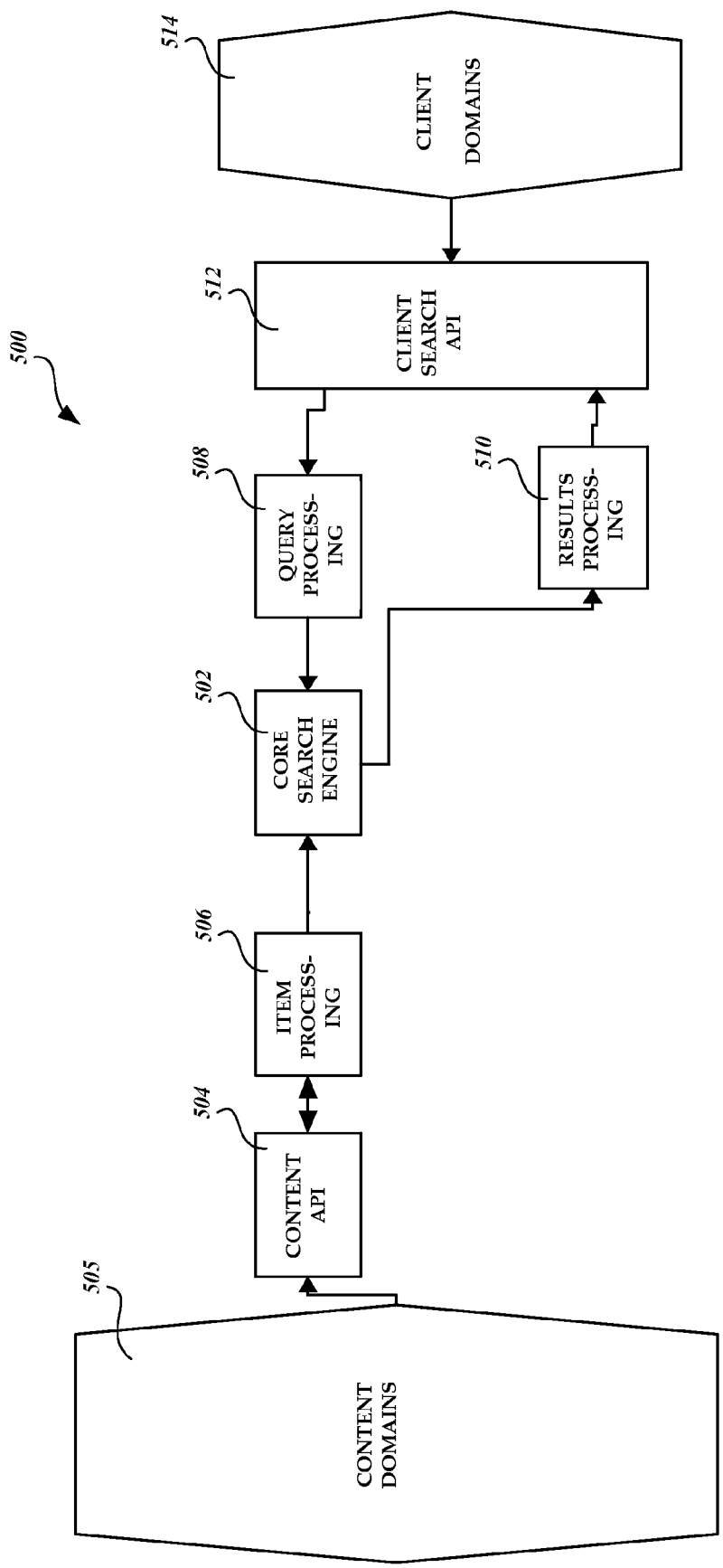
FIG. 5 is a block diagram depicting components of an exemplary system configured to provide indexing and searching services.

FIG. 5 is a block diagram depicting components of an exemplary system 500 configured to provide indexing and searching services, but is not so limited. As shown, the exemplary system 500 includes a core search engine 502, a content application programming interface (API) 504, item processing 506, query processing 508, results processing 510, and a client search API 512. It will be appreciated that the indexing and searching features can be implemented as part of a processor-driven computer-implemented environment. In other embodiments component features can be further combined and/or subdivided.

The core search engine 502 includes functionality to create indexes based on raw textual input and return results for queries by using the indexes. In an embodiment, the core search engine 502 manages the indexing of information associated with a number of shared and/or tenant-specific properties. The core search engine 502 of one embodiment utilizes a reusable index structure that includes the use of a defined number of physical index fields to manage the indexing of tenant-specific property information, as described in detail above.

The content API 504 is used by various clients, crawlers, connectors, etc. (e.g., content domains 505) to submit and receive content for subsequent processing and indexing operations. Item processing 506 is used to parse documents and other content to produce textual and other output, such as a list of properties for example (e.g., document title, document content, body, locations, size, etc.). Query processing 508 operates to analyze raw user input (e.g., query), including improving and/or rewriting a query for execution using the core search engine 502. For example, query processing 508 can be configured to detect language, correct spelling errors, add synonyms to a query, rewrite abbreviations, etc.

Results processing 510 operates to process results provided by the core search engine 502 before they are returned. For example, results processing 510 can include ranking and relevancy determining algorithms or other features used in part to return relevant search results. The client search API 512 is used by search front-end and other applications (e.g., client domains 514) to issue queries and retrieve results using the queries.

In one embodiment, the system 500 can also include an alerting engine that operates to store queries and analyzes all incoming (e.g., crawled or fed) documents. For example, when a new document matches a query, the altering engine can send out an alert to any subscribers of the alert. The exemplary system 500 can be used to provide rich searching services for individual tenants to manage and consume their own data while at the same time providing a store for domain-wide terms, keywords, content types, and other data. The searching services can be shared and hosted on the same farm or hosted on a dedicated services farm or on different farms. Cross-farm and single-farm services can also be implemented.

Figure 6:
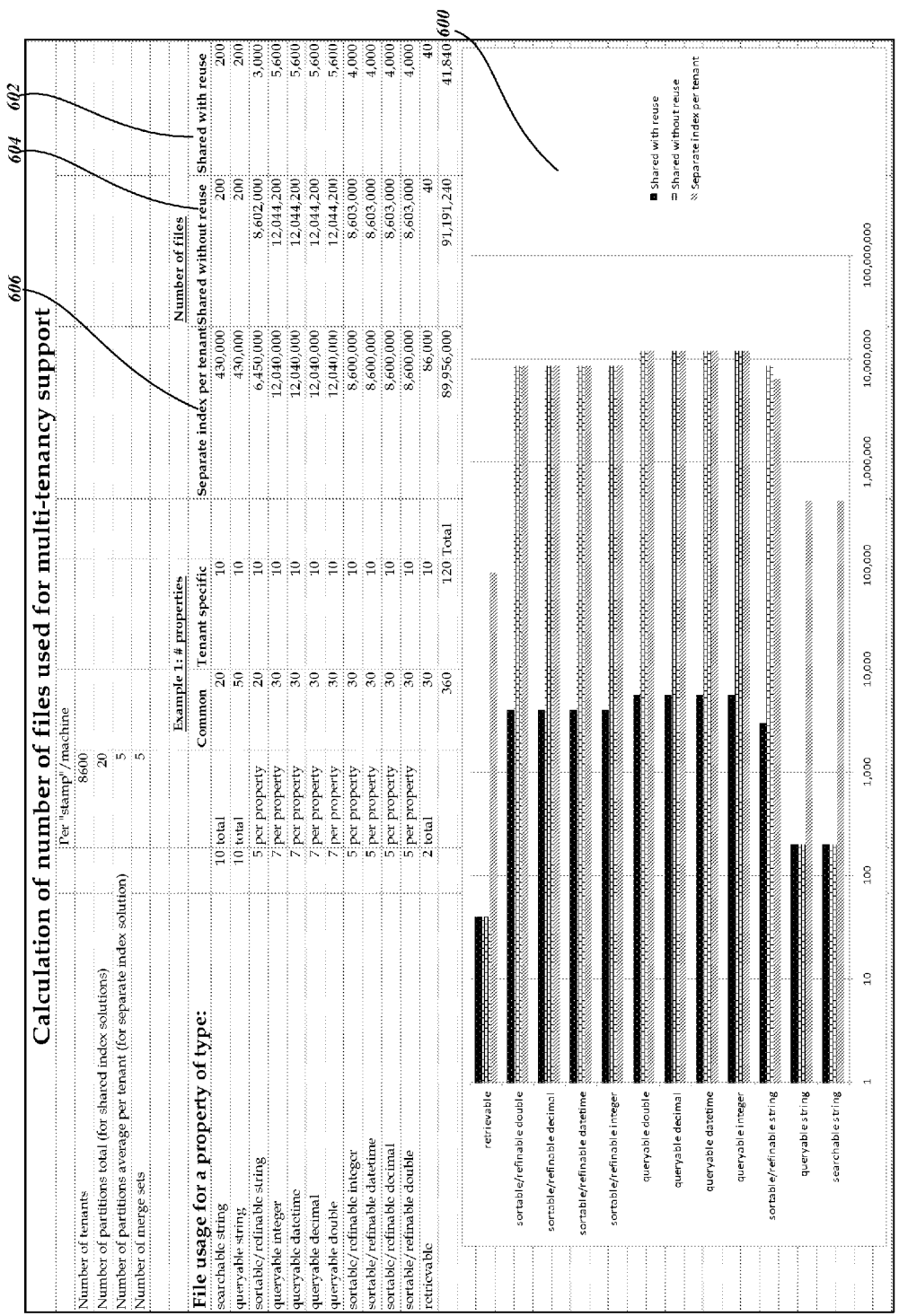
FIG. 6 depicts differences in number of files (resources) for different index per tenant solutions.

FIG. 6 depicts differences in number of files (resources) for different exemplary index per tenant solutions. As shown in FIG. 6, a graph is provided that illustrates how many files result from using different indexing methods and schema representations. For this example, a shared with reuse indexing method is used to generate the shared with reuse data 602, a shared without reuse indexing method is used to generate the shared without reuse data 604, and a separate index per tenant method is used to generate the separate index per tenant 606. As shown, using the shared with reuse indexing method, a search engine can reduce the number of files for the given example from around 90 million to about 41,000, a significant reduction. The graph includes a logarithmic scale since the exemplary shared with reuse data 602 is so much smaller than the extremely large values from the worst solution in some cases.

While certain embodiments are described herein, other embodiments are available, and the described embodiments should not be used to limit the claims. Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations.

Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of a device or system. By way of example, and not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, back-end networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 7:
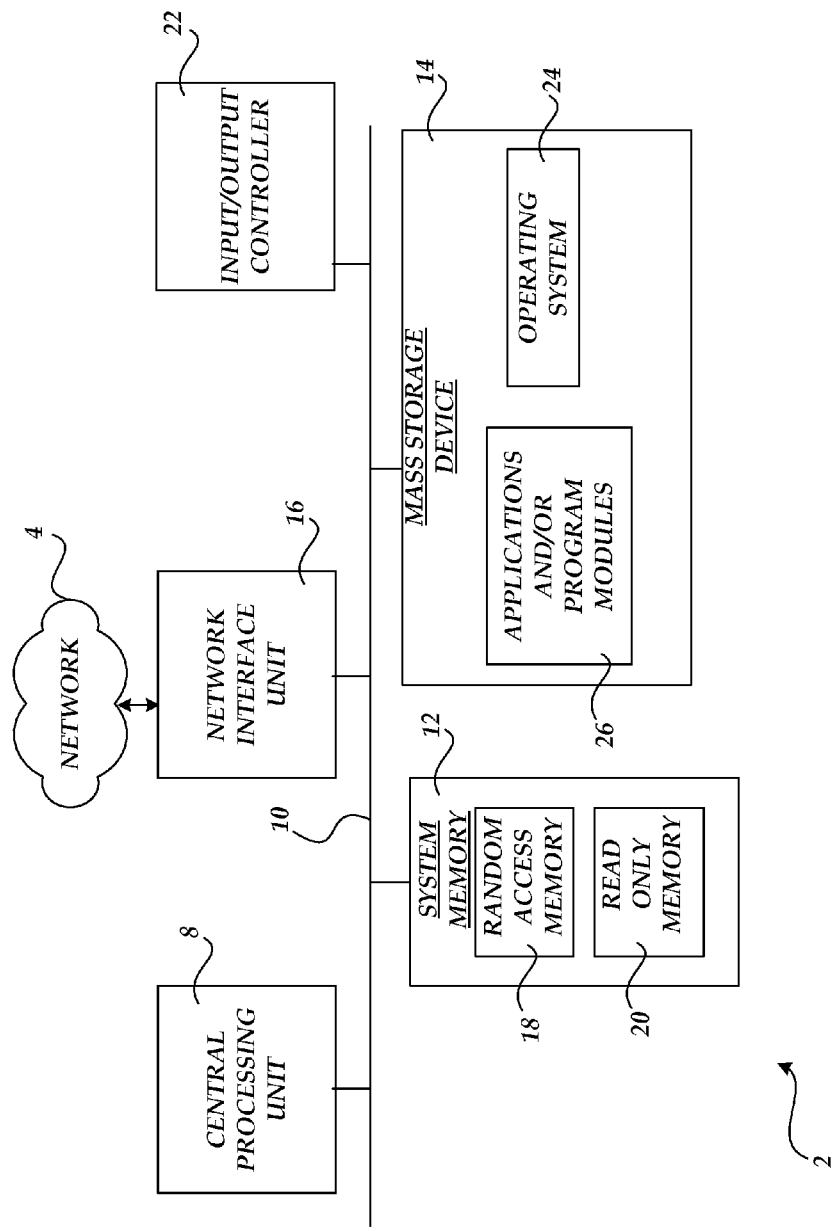
FIG. 7 is a block diagram illustrating an exemplary computing environment for implementation of various embodiments described herein.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computer 2 comprises a general purpose server, desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules/resources 26.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:
1. A method comprising:
providing indexing services for a search engine deployed in a network including using a number of reusable index fields, each reusable index field having a corresponding field type;
crawling tenant domains to provide information for use in populating the number of reusable index fields;

indexing the information associated with a plurality of tenants and tenant-specific properties including using the number of reusable index fields based in part on the corresponding field types and the tenant-specific properties, the indexing including mapping data of the same data types of different tenants to the reusable index fields; and storing the indexed information for use by the search engine.

2. The method of claim 1, further comprising providing the indexing services using the number of reusable index fields including searchable, queryable, sortable, refinable, and retrievable field types.

3. The method of claim 1, further comprising mapping the information associated with tenant-specific properties to corresponding reusable index fields based in part on a searchable item field mapping, a queryable item field mapping, a sortable and refinable item field mapping, and a retrievable item field mapping.

4. The method of claim 1, further comprising providing indexing services using a reusable index structure that includes a defined number of physical index fields to manage the indexing of tenant-specific property information.

5. The method of claim 1, further comprising providing the indexing services including using a tenant-specific schema to map content associated with tenant-specific properties to appropriate reusable index fields.

6. The method of claim 1, further comprising providing the indexing services including using the reusable index fields to index tenant information including web pages, documents, spreadsheets, music, pictures, video, contacts, lists and list items, tasks, and other items.

7. The method of claim 1, further comprising mapping tenant information to the reusable index fields including dynamically allocating a reusable index field for each tenant based in part on a matching feature set for the reusable index field.

8. The method of claim 2, further comprising providing indexing services including populating the number of reusable index fields with multi-tenant information based in part on a queryable string, queryable integer, queryable date/time, queryable decimal, queryable double, sortable and refinable integer, sortable and refinable date/time, sortable and refinable decimal, and sortable and refinable double.

9. The method of claim 2, further comprising providing the indexing services including using the number of reusable index fields to manage one or more overlapping or partially overlapping tenant properties.

10. The method of claim 2, further comprising providing the indexing services including using the number of reusable index fields for retrievable values as a shared structure for integer, string, date/time, decimal, or double field types.

11. The method of claim 4, further comprising mapping tenant information to the reusable index structure based in part on the type of searching features specified for each tenant-specific property.

12. A system comprising:
a crawler component to crawl items of tenant domains as part of collecting information to index including information associated with a shared set of managed properties and information associated with distinct tenant properties;

an index component configured to:
use collected information to provide indexing operations and indexed information;
reuse a defined number of physical index fields independent of a number of managed properties indexed; and
map tenant information of the same data types to the defined number of physical index fields based in part on a searchable item field mapping, a queryable item field mapping, a sortable and refinable item field mapping, and a retrievable item field mapping; and a search engine to provide search results based in part on aspects of the indexed information; and memory to store the indexed information.

13. The system of claim 12, further comprising a shared index including a number of shared tenant properties and a limited index including the reusable index fields and mapped tenant data.

14. The system of claim 12, further comprising a virtualized index including reusable physical index fields associated with multiple tenants corresponding to a number of tenant-specific and non-overlapping properties.

15. A computer storage device that stores instructions which, when executed by a processor, provide a service by:
using a crawler component to crawl items of tenant domains as part of collecting tenant information to index including information associated with a shared set of managed properties and information associated with tenant-specific properties;

using an indexing component and a number of defined reusable index fields as part of indexing the tenant information by mapping data of the same data types for different tenants of a plurality of tenants to the number of defined reusable index fields, each reusable index field having a field type to manage the distinct tenant-specific properties as part of providing indexing services for the plurality of tenants;

receiving the tenant information associated with the plurality of tenants and tenant-specific properties;

populating an indexing structure including using the number of defined reusable index fields for different types of tenant information based in part on underlying field types, the tenant-specific properties, and corresponding tenant information; and storing the indexing structure.

16. The storage device of claim 15 that stores instructions which, when executed by a processor, provide a service by populating the number of defined reusable index fields according to an underlying field type including sortable, refinable, queryable, and retrievable field types.

17. The storage device of claim 15 that stores instructions which, when executed by a processor, provide a service by virtualizing physical index fields across multiple tenants as part of a cloud deployment.

18. The storage device of claim 15 that stores instructions which, when executed by a processor, manage aspects of a main index including properties shared by multiple tenants and aspects of a reusable field index including unshared properties of various tenants.

* * * * *